July 15, 1930.  W. ANDERSON  1,770,565
MACHINE FOR TREATING FOWLS IN PREPARATION FOR PICKING
Filed Nov. 26, 1928  2 Sheets-Sheet 2
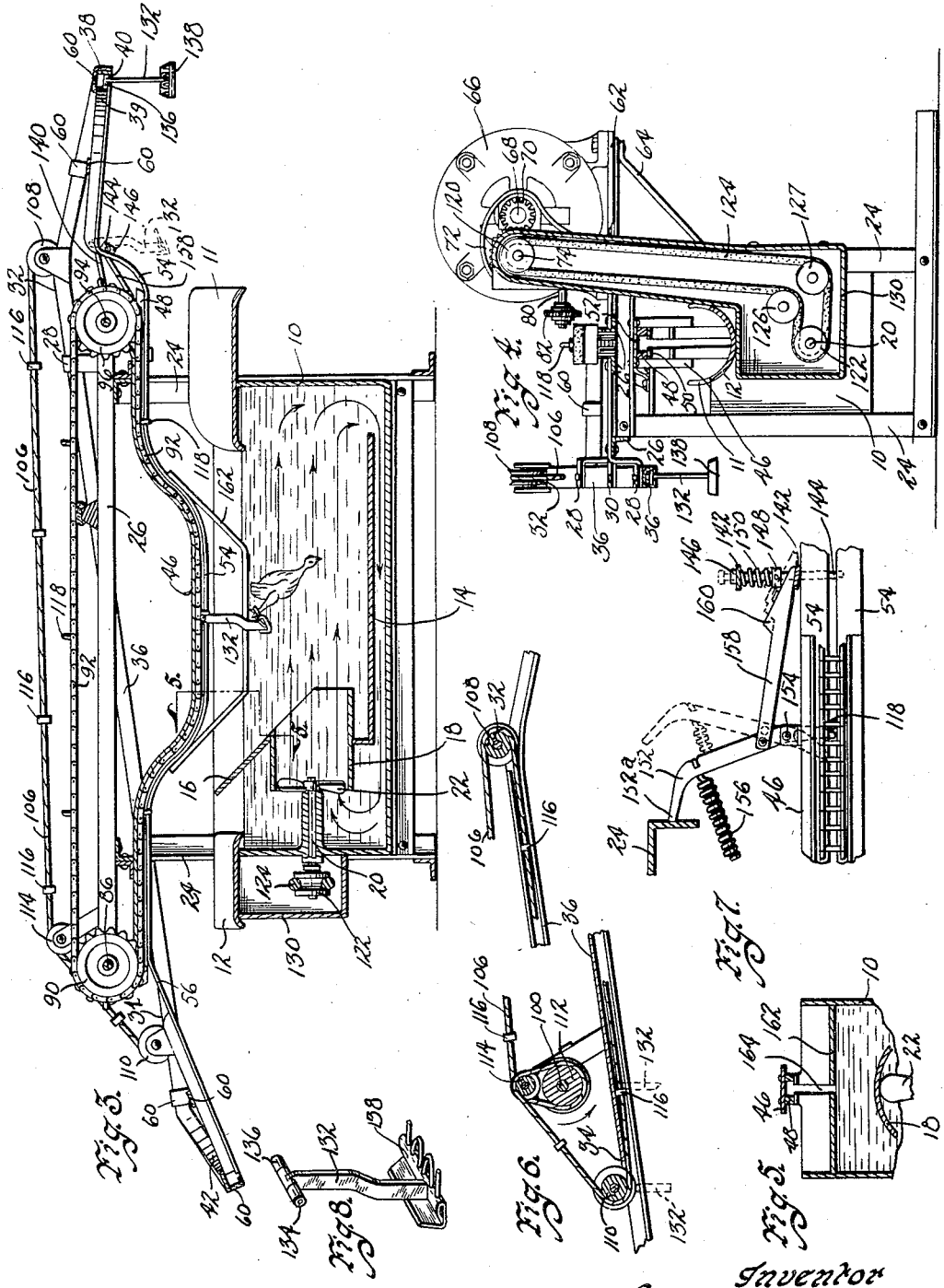
Inventor
William Anderson
by Bair, Freeman & Sinclair
Attorneys
Witness
Vinton Read.

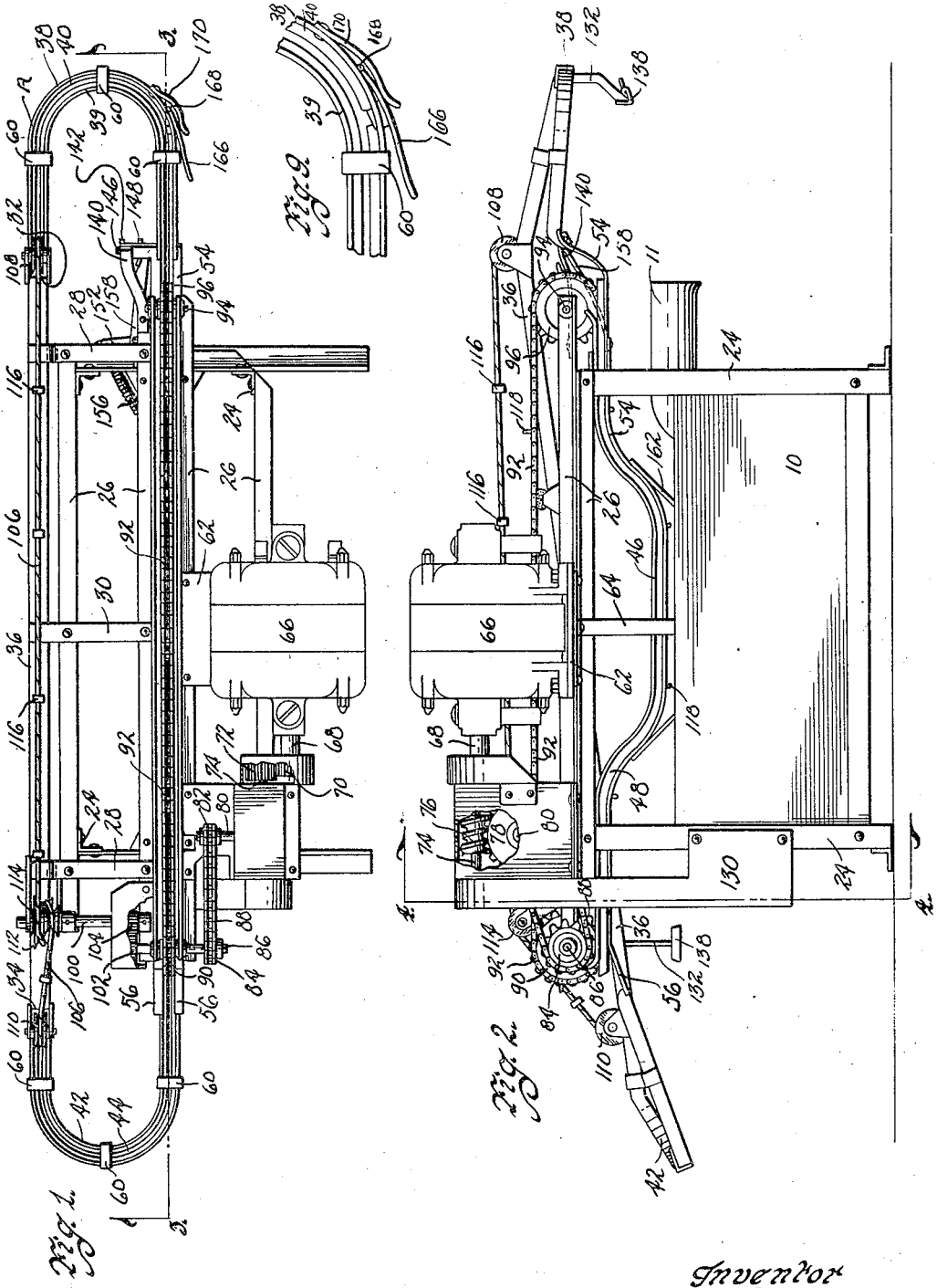

Patented July 15, 1930

1,770,565

UNITED STATES PATENT OFFICE

WILLIAM ANDERSON, OF ATLANTIC, IOWA, ASSIGNOR OF ONE-HALF TO DARIUS E. SHRAUGER, OF ATLANTIC, IOWA

MACHINE FOR TREATING FOWLS IN PREPARATION FOR PICKING

Application filed November 26, 1928. Serial No. 321,951.

My invention has to do with a machine for treating fowls in preparation for picking.

More particularly, it is my purpose to provide a machine whereby chickens or other fowls after having been killed may be mounted on a suitable means and carried into a body of heated water for thoroughly subjecting the fowls to the action of the water and may then be automatically taken out of the water.

In this connection, my invention includes numerous novel features whereby the handling of the fowls is made quick, convenient and easy.

Still another object is to provide in such a machine means for creating a current of water in a direction opposite that of the path of travel of the fowls being moved through the water, so as to cause the water to travel against the feathers and to reach to the skin of the fowl and thoroughly soak the feathers, so that the picking thereafter may be made easier.

It is my purpose to provide novel means for creating and maintaining such movement of the water.

With these and other objects in view, my invention consists in the construction, arrangement and combination of the various parts of my machine, whereby the objects contemplated are attained, as hereinafter more fully set forth, pointed out in my claims, and illustrated in the accompanying drawings, in which:

Figure 1 shows a top or plan view of a machine embodying my invention.

Figure 2 illustrates a side elevation of the same.

Figure 3 is a detail, sectional view taken on the line 3—3 of Figure 1.

Figure 4 is a transverse, sectional view taken on the line 4—4 of Figure 2.

Figure 5 is a detail, sectional view taken on the line 5—5 of Figure 3.

Figure 6 is a vertical, sectional view illustrating the pulleys forming part of the mechanism, parts being broken away.

Figure 7 is a detail, view of the trigger mechanism, parts being broken away and parts being shown in section.

Figure 8 is a perspective view of one of the shackles which travels along the track for carrying the fowls; and Figure 9 is a top or plan view of a portion of the track illustrating the gate structure provided for the insertion of the shackles.

My improved machine comprises a tank which will now be described.

*Tank and water circulating system*

In the accompanying drawings, I have used the reference numeral 10 to indicate generally a tank which may be substantially rectangular in size and is considerably longer than it is wide.

The right-hand end of the tank as shown in Figures 1, 2 and 3 is the intake end. Mounted at the right-hand end is an intake chute or guide 11.

At the left-hand end of the tank is an outlet chute or guide 12.

There is provided above the main bottom of the tank a horizontal false bottom 14, which terminates short of each end of the tank. Near the outlet end of the tank, the false bottom 14 connects with a transverse partition 16. Mounted in the transverse partition is a tubular member 18.

Journaled at the front end of the tank and projecting thereinto is a shaft 20 on the inner end of which is a propeller or fan 22, which when rotated forces the water toward the inlet end of the tank as shown by dotted lines in Figure 3 and thus creates a strong current toward the inlet end and in a direction opposite that of the travel of the fowls.

At the four corners of the tank, posts 24 extend upwardly therefrom and support at the top a rectangular frame having the side members 26, the end members 28 and the central cross brace 30.

*Tracks and operating mechanism*

There is provided above the tank 10 an endless track indicated generally at A in Figure 1. At one side of the tank, this track from point 32 to point 34 is in the form of a tubular member indicated at 36 (Figures 1 and 4) with a longitudinal slot in its under surface.

At each end, the track has a U-shaped portion. The U-shaped portion at the intake end of the tank indicated at 38 in Figure 1 comprises an upwardly opening channel with a continuous slot 40 in its bottom.

The U-shaped portion of the track at the left-hand or outlet end of the tank, indicated at 42, also comprises an upwardly opening channel with a continuous slot 44 in its bottom.

One arm of each U-shaped member 38 and 42 connects with a track portion which extends lengthwise of and above the tank. This portion of the track indicated generally at 46 in Figure 2 for the greater portion of its length comprises what is in fact a tubular track with a slot in its lower part. It may be built as shown for instance in Figure 4 of a pair of parallel bars 48 with strips on their lower surfaces projecting toward each other as indicated at 50 and with a cover strip 52.

The central part of the track portion 46 for a considerable extent of its length dips downwardly toward the tank as shown in Figure 2.

The right-hand end of the track portion 46 is connected with one arm of the track portion 38 by means of the pair of parallel strips 54, which are inclined from the end of the U-shaped track portion 38 downwardly and forwardly as shown in Figure 2.

The other end of the track portion 46 is connected with one arm of the U-shaped track portion 42 by means of a pair of spaced strips 56 shown in Figures 1 and 2.

The portion 42 of the track may dip downwardly somewhat as shown in Figure 2.

It will be noted that the portion 38 is at a level substantially above the portion 46 as seen in Figure 2 and that the portion 36 is inclined downwardly from the intake end of the tank toward the other end thereof.

It will, of course, be understood that many changes may be made in the details of the construction and arrangement of the track and the particular track here shown is simply to illustrate a satisfactory form in which that portion of my invention may be embodied. As shown for instance in Figure 1, the halves of the track members 38 and 42 are connected at their upper portions by bars or the like 60.

The frame members 28 and 30 project laterally beyond the frame members 26 to furnish supports for the track portion 36 and are properly bent to support that track portion at the desired height.

Projecting from one of the frame members 26 on the side opposite the track portion 36 is a shelf or support 62. A brace 63 extends from the shelf to the tank 10. On the shelf 62 is a motor 66 having a shaft 68 on the outer end of which is a pinion 70 (see Figures 1 and 2). The pinion 70 meshes with a pinion 72 on a suitable counter-shaft 74. On the shaft 74 is a worm 76 meshing with a worm wheel 78 on a transversely mounted shaft 80 (see Figure 2). The shaft 80 has on its inner end a sprocket 82 in line with a sprocket 84 on another transverse shaft 86 located rearwardly from the shaft 80. A chain 88 travels on the sprockets 82 and 84.

The shaft 86 stands just above the left-hand end of the track portion 46 and has on it a sprocket 90 on which travels a chain 92 (see Figures 1 and 3).

Above the other end of the track portion 46 is mounted a short transverse shaft 94 on which is a sprocket 96 over which the chain 92 travels. Suitably mounted is another transverse shaft 100. Motion is transmitted from the shaft 86 to the shaft 100 by means of pinions 102 and 104 (Figure 1).

An endless flexible member 106 has one stretch traveling through the tubular track stretch member 36. At the right-hand end of the track portion 36 is mounted a pulley 108 over which the rope or flexible member 106 travels.

It will be noted that at the other end of the track portion 36 is a similar pulley 100 (see Figure 3).

Referring now to Figures 1, 3 and 6, it will be noted that on the shaft 100 (clearly shown in Figure 1) is a pulley 112 (clearly shown in Figure 6) located just below the pulley 114, best shown in Figures 3 and 6.

The flexible member 106 is extended over the pulley 114 and thence around the pulley 112 and again over the pulley 114. The pulley 114 is a double pulley. This permits the particular threading of the flexible member 106 above referred to. The flexible member 106 is provided at regular intervals with lugs or the like 116. On the shaft 92 already referred to are outwardly projecting lugs 118.

For operating the propeller shaft 20, the following means are provided:

On the rear end of the shaft 74 is a pulley 120 shown best in Figure 4. On the rear end of the shaft 20 is a pulley 122 shown in Figure 4 and also in Figure 3.

A belt 124 travels over the pulleys 120 and 122 and around suitably arranged idler pulleys 126 and 127 shown in Figure 4. It will be noted that suitable gear casings 128 and 130 are provided.

For supporting the fowls in their travel around the track, I provide a shackle structure comprising a shank 132, shown in Figure 8, having at its upper end a transverse shaft or rod 134 projecting in both directions from the shank 132 and having tubular rollers 136 on its ends. The rollers 136 travel on the track and the shank 132 projects downwardly through the slot in the track.

On the lower end of the shank 132 is a shackle member 138 on which the fowls may be hung.

At the intake end of the machine is a device for automatically starting the fowls through the tank when a loaded shackle has been placed in a certain position at the upper end of the track members 34.

Referring now to Figures 1, 3 and 7, it will be observed that a suitable bracket 140 is supported on the track and one of the frame members 26. The bracket 140 has a pair of transversely spaced downwardly projecting arms 142 shown in Figures 3 and 7. A pin 144 is slidably mounted in the arms 142 as shown in Figure 7. On the outer end of the pin 142 is a head 146. On that pin between the arms 142 is detachably mounted and fixed a collar 148. Between the collar 148 and one of the arms 142 is a coil spring 150 which normally tends to force the pin to such position that it projects across below the slot between the track members 54.

Pivoted to the track portion 46 forwardly from the pin 144 is a trigger 152 which projects in both directions from its pivot 154. A coil spring 156 is secured to the trigger device 152 as shown in Figures 1 and 7 and to the track portion 46 forwardly of the pivot point 154.

A bar 158 is pivoted to the trigger member 152 near the pivot 154 and projects forwardly and has at its forward end the triangular portion 160 sliding between one of the members 142 and the collar 148, as shown in Figure 7.

One end of the trigger member 152 as at 152ª is normally yieldingly held against one of the upright posts 24 and the other end then projects just below the slot in the track portion 46.

Below the central lower part of the track portion 54 is a longitudinally arranged shield 162 with a central slot 164, the purpose of which is to keep the fowls down in the water, as will be hereinafter more fully explained.

In order to provide for the convenient mounting of the shackles on the track, there is provided a gate in the track portion 38 which will now be described.

Referring to Figure 9, it will be seen that a portion of one side wall of the track and a portion of the bottom indicated at 166 is hinged at 168, so that it may be swung out. A spring 170 normally holds the gate closed.

Operation

I shall now describe the practical operation of my improved machine and this will make the construction clearer and more easily understood.

A chicken which has been killed and bled is hung on one of the shackles 138 and the shackle is then moved by hand to the position shown by dotted lines near the right-hand end of Figure 3. The parts are so arranged that the shank of the shackle may be moved to rest against the pin 144, so that when the pin is withdrawn from across the slot between the track members 54 (see Figures 1 and 7) the shackle with the fowl thereon will drop downwardly.

Assume that the motor is set in operation. The motor shaft 68 through the pinions 70 and 72 will operate the shaft 74 shown in Figure 1. The shaft 74 seen in Figures 2 and 4 will through the pulleys 120, 126, 127 and 122 and the belt 124 thereon operate the shaft 20 and the propeller 22 for creating a strong forward current through the central portion of the tank.

The rotation of the shaft 68 (Figures 1 and 2) will impart through the operation of the worm 76 and worm wheel 78 rotation to the shaft 80 and thence through the sprockets 82 and 84 and chain 88 to the shaft 86. The sprocket 90 on the shaft 86 (Figure 3) imparts movement to the chain 92. From the shaft 86 (Figure 1) rotation is imparted through the pinions 102 and 104 to the shaft 100 and thus to the pulley 112 (Figure 6) and to the pulley 114 and the flexible member 106.

The lugs 118 on the chain 92 strike the projecting end of the trigger member 152 (see Figures 3 and 7) moving that trigger member from its position shown in full lines in Figure 7 to its position shown in dotted lines in that figure. This movement of the trigger member 152 causes the triangular portion 160 of the member 158 to slide between the collar 148 and the adjacent member 152, and thus force the pin 144 away from the slot between the track members 54. This permits the shackle shown in dotted lines in Figure 3 to drop downwardly following the track members. Thereupon the next lug 118 will engage the upper end of the shank 132 and carry the shank and its shackle and the fowl supported thereby through the tank.

The members 162 are so shaped, as shown in Figure 3, as to insure that the fowl will be wholly immersed in the water.

The rapidly moving current will drive the water into the feathers of the fowl, and the fowl will swing toward the front end of the machine to a substantial degree in all probability considerably more than as shown in Figure 3.

It will be understood that the temperature of the water may be maintained in any suitable way not here particularly considered, and that means may be provided for permitting outflow of water and the supplying of fresh water.

When the fowl reaches the track portion 42, it is removed from the shackle and the workman shoves the shackle shank far enough into the track portion 36 to permit the lugs 116 to carry the shackle to the intake end of the machine.

This cycle of operations is continued for the other shackles for operating the machine at its full capacity.

It will be understood that the motor may be readily regulated for controlling the speed of the passage of the bird through the water and the length of time during which the bird is in the water.

A machine of this kind has numerous important advantages.

As compared with hand dipping, the period during which the fowls are in the water may be very accurately regulated. It may be controlled according to the age of the birds.

There is a substantial saving of time over hand dipping. The immersion of the fowls is made automatic and certain.

The provision of the means for providing the current of water as heretofore explained insures that the birds will be thoroughly wet to the skin.

In addition, there are numerous mechanical structures which make for the successful operation of the machine.

The general operation of the machine is in summary as follows:

The fowls are hung on the shackles on the intake end of the U-shaped track, killed and bled for a proper length of time. They are then moved by hand to position adjacent to the pin 144. From there, they are automatically taken by the mechanism and carried through the water. The arrangement of the mechanism is such that the birds will not be crowded during passage through the water, but will be properly separated during the immersion period.

The fowls are automatically moved out of the water to the U-shaped portion of the track at the discharge end of the tank, where again they are not subject to the automatic mechanism, and there will then be ample time for the picker to take them off for dressing.

After taking off the fowls, the picker pushes the fowls up to where they are engaged automatically by the mechanism and taken to the intake end of the machine.

It will be understood that the machine here shown is illustrative and modifications may be made in the construction and arrangement of parts without departing from the real spirit and purpose of the invention.

I claim as my invention:

1. In a machine of the class described, a tank, means for carrying fowls through the tank and immersing them in water during their movement, and means for creating a current of water horizontally of the tank in a direction opposite to that of the path of travel of the fowls through the tank.

2. In a structure of the class described, a tank, an endless track associated therewith having a portion dipping downwardly so that birds carried along the track may be immersed in the water in the tank, means for supporting birds on the track, means operating for a portion of the length of the track only for carrying said fowl holding means for drawing them through the water in the tank, and means for carrying the fowl holding means along the track for returning them toward the loading end of the track.

3. In a machine of the class described, a tank, an endless track associated with said tank, said track having a central slot, fowl holding means comprising a shank projecting through said slot and provided with laterally projecting elements at its upper end for traveling on the track, said shanks having shackles at their lower ends.

4. In a machine of the class described, a tank, an endless track associated with said tank, said track having a central slot, fowl holding means comprising a shank projecting through said slot and provided with laterally projecting elements at its upper end for traveling on the track, said shanks having shackles at their lower ends, a portion of said track being arranged immediately above the tank, said shanks having projections to engage such portion for preventing the shank from rising.

5. In a machine of the class described, a tank, an endless track associated with said tank, said track having a central slot, fowl holding means comprising a shank projecting through said slot and provided with laterally projecting elements at its upper end for traveling on the track, said shanks having shackles at their lower ends, said track having a portion inclined substantially from the horizontal arranged near the intake end of the tank, movable means projecting across the tank at the upper end of such portion, and means for automatically actuating such movable means for rendering them inoperative at regular intervals.

6. In a machine of the class described, a tank, an endless track associated with said tank, said track having a central slot, fowl holding means comprising a shank projecting through said slot and provided with laterally projecting elements at its upper end for traveling on the track, said shanks having shackles at their lower ends, means along one stretch of the track for carrying the fowl holding means across the tank for thus immersing the birds in the contents of the tank, said last means comprising an endless traveling flexible device having members projecting into the slot in the track.

7. In a machine of the class described, a tank, an endless track associated with said tank, said track having a central slot, fowl holding means comprising a shank projecting through said slot and provided with laterally projecting elements at its upper end for traveling on the track, said shanks having shackles at their lower ends, means along one stretch of the track for carrying the fowl holding means across the tank for thus immersing the birds in the contents of the tank, said last means comprising an endless traveling flexible device having members projecting into the slot in the track, said track having a portion substantially inclined from the horizontal, movable means near the upper part of said portion normally projected into the path of travel of the fowl holder, and means adapted to be actuated by said members for rendering said last described means inoperative.

8. In a machine of the class described, a tank, an endless track associated with said tank, said track having a central slot, fowl holding means comprising a shank projecting through said slot and provided with laterally projecting elements at its upper end for traveling on the track, said shanks having shackles at their lower ends, an endless device arranged to travel along one stretch of the track having members adapted to project through the slot of the track, endless means traveling along another stretch of the track having spaced lugs for engaging the fowl holding means, said track having portions at each end free from any conveying devices.

9. In a machine of the class described, a tank, an endless track associated therewith, fowl holding means adapted to travel along said track, independent means arranged for carrying said fowl holding means along certain spaced stretches of the track, means for creating a strong current of water in the tank in the direction opposite that of the travel of the fowls therethrough, a motor, and means for operating said endless traveling members and said current producing means from the motor.

10. In a machine of the class described, a tank, a track associated therewith formed with side walls and a bottom, having a longitudinal slot therein, fowl carrying means, each comprising a shank with laterally projecting members at its upper end for traveling on the bottom of the track, said track having a hinged gate for permitting the insertion of the fowl carrying means.

Des Moines, Iowa, November 1, 1928.

WILLIAM ANDERSON.